United States Patent
Seal et al.

(10) Patent No.: US 8,274,966 B2
(45) Date of Patent: Sep. 25, 2012

(54) MOBILE COMMUNICATION DEVICE PROVIDING INTEGRATED ACCESS TO TELEPHONY AND INTERNET

(75) Inventors: Christopher Henry Seal, Reading (GB); Gaetano Vitolo, Campobasso (IT); Kevin David Joyce, South Croydon (GB); Nadir El Yakhlifi, Santa Brigida (ES)

(73) Assignee: Hutchison Whampoa Three G IP (Bahamas) Limited, Nassau (BS)

( * ) Notice: Subject to any disclaimer, the term of this patent is extended or adjusted under 35 U.S.C. 154(b) by 503 days.

(21) Appl. No.: 12/250,173

(22) Filed: Oct. 13, 2008

(65) Prior Publication Data

US 2009/0147771 A1     Jun. 11, 2009

(30) Foreign Application Priority Data

Oct. 12, 2007   (GB) .................................. 0720110.6
Oct. 29, 2007   (GB) .................................. 0721184.0

(51) Int. Cl.
*H04L 12/66*          (2006.01)

(52) U.S. Cl. ........................................................ 370/352
(58) Field of Classification Search .................. 370/252, 370/329, 338, 401, 260, 352, 356
See application file for complete search history.

(56) References Cited

U.S. PATENT DOCUMENTS

2007/0143397 A1*  6/2007  Guedalia et al. .............. 709/203
2010/0138770 A1*  6/2010  Lu et al. ......................... 715/771
2010/0260157 A1* 10/2010  Buchholz et al. ............. 370/338

* cited by examiner

*Primary Examiner* — Man Phan
*Assistant Examiner* — Nourali Mansoury
(74) *Attorney, Agent, or Firm* — Rankin, Hill & Clark LLP

(57) ABSTRACT

Provided are devices, methods, communication managers and user interface solutions that enable access to multiple services from a mobile communications device. A mobile communication device that provides telephony services via a PSTN also includes multiple communication channels that exploit packet data transfer via an IP network, for example enabling VoIP, instant messaging and other internet-based communication services to be initiated from a mobile telephone.

16 Claims, 10 Drawing Sheets

1. Pick your contact

2. Choose to chat

Get chatting

MOBILE COMMUNICATION DEVICE PROVIDING INTEGRATED ACCESS TO TELEPHONY AND INTERNET

FIELD OF INVENTION

The present invention relates to wireless communication technologies and devices and, in particular, provides improved devices, methods, communication managers and user interface solutions that enable access to multiple services from a mobile communications device.

BACKGROUND

It has been possible for some time to exploit the inexpensive data communications that are available via Internet Protocol networks to make very low cost international telephone calls and domestic telephone calls. Users communicate using their computers, which transform voice signals into packets of compressed digital audio information that are then sent over the Internet Protocol network. Part of the cost saving for wireline networks results from using a single network for sending voice and data, and in particular the ability to exploit the spare capacity of the available networks. The transfer of voice signals using an Internet Protocol network is referred to as 'voice over IP' or 'VoIP'.

A program that has contributed to the success of VoIP and which enables managing VoIP calls from a computer is the Skype™ program and service. This allows users to make free voice calls to other Skype users anywhere in the world, or to call fixed-line telephones or mobile telephones for a fee. The Skype program includes support for instant messaging, file transfer, short message service (SMS) and video conferencing and so provides access from a computer to multiple communication channels.

Although this ability to transfer voice signals using an internet protocol network can represent very good value to users who make regular international calls, as well as being usable for domestic calls and other data services, its adoption has not been as widespread as might be expected. Many people prefer to continue making voice calls via their fixed-line telephones or mobile telephones even when these calls are more expensive. The reason for this limited adoption is partly the proactive effort required by users to configure a computer to make use of VoIP services. For example, a user typically has to acquire and install new software on their home computer, whereas typical mobile telephones have been unable to provide VoIP capability. Another reason for low adoption of VoIP services is the constraint of having to be in close proximity to the computer that provides the VoIP service.

Mobile client applications for internet telephony solutions such as Skype have been available for some time. However there is still a higher degree of effort required by users to use these mobile internet telephony clients, as the user must first launch the application, before accessing the address book within the application to make outbound calls. Similarly for inbound calls, the user must already be visible as 'logged in' or 'online' in the internet telephony solution's presence status server before incoming calls can be accepted.

Another problem holding back the wider adoption of VoIP services in mobile communication networks such as 3G WCDMA is that the VoIP packet-based technology does not map well to the characteristics of cellular networks. In general terms, for a user to experience a good-quality natural conversation on a two-way voice call, it is necessary to ensure that the total delay in relaying the voice signal is kept low. If the end-to-end latencies are low, those engaged in the two-way conversation do not usually notice the delay in the other party's replies. If the delay times are long, there will appear to be unnaturally long silences before the other party replies. The delay experienced in each direction is a factor of the sample size of voice encoded, the encoding process, the transmission time, and the decoding and playback time. It is estimated that the round-trip delays for cellular transmission network should be less than 100 milliseconds and preferably significantly less (e.g. 50 milliseconds). Typical packet data latencies for Release 99 3GPP UMTS cellular networks are of the order of 200 milliseconds round-trip delay. With more recent releases of 3G such as the HSDPA and HSPA networks, the round-trip delay is being reduced towards the required target, but even then the bandwidth used for VoIP call is potentially large compared to that required by a circuit-switched radio bearer designed to accommodate a 12.2 kbps voice signal (e.g using GSM Full Rate or AMR codecs).

Given that packet-based VoIP services for 3G networks are still immature and inefficient, services such as Skype have also been implemented by way of gateways between circuit-switched and packet-switched networks. In the case of the mobile operator 3, it is already known that Skype calls are currently implemented as circuit-switched calls over the cellular network to a network-based gateway that then converts the signal to a packet-based Skype call.

Furthermore, the inventors of the present invention have identified a problem in that anyone who wishes to make use of multiple communication services over an IP network would currently be required to be very proactive to control the various client programs that control the various communication services. The inventors have identified a number of other problems that currently result in a very fragmented user experience.

SUMMARY

In a first aspect of the present invention, there is provided a mobile communications device comprising:
  means for sending and receiving signals via a circuit-switched telecommunications network;
  means for initiating communications over an Internet Protocol network via each of a plurality of separate communication services; and
  a communication manager providing coordinated access to the plurality of separate communications services.

A communication manager according to one aspect of the invention enables a level of integration between a plurality of separate internet-based communication services that has not previously been available on a mobile communications device that also provides circuit-switched telephony and messaging services. For example, the invention enables a more fully integrated Skype™ solution than has previously been available on a mobile telephone. In one embodiment of the invention, a mobile telephone user is able to originate and receive Skype calls and to send and receive chat messages from their mobile telephone handset. In a particular embodiment, a Skype program is integrated with the mobile device's messaging functionality, contacts lists and media playback functions. For the purposes of this patent specification, the term 'contact list' is used interchangeably with the term 'address book'.

For the purposes of the present application, a circuit-switched telecommunications network includes cellular GSM and UMTS networks and other wireless communication networks that require a dedicated 'circuit' or communication channel between communicating network nodes.

These circuit-switched networks are differentiated from packet-switched communications in which data is segmented into packets and each packet is labelled with a number and destination and may be sent to the destination via different routes.

A second aspect of the present invention provides a mobile communications device comprising:

means for sending and receiving signals via a circuit-switched telephone network; and means for sending and/or receiving communications over an Internet Protocol network via each of a plurality of separate communication services;

wherein the mobile communication device stores data associated with each of the separate communications services, and wherein the mobile communications device comprises means for merging data that is stored in the mobile communications device for a first one of the plurality of separate communication services with data that is stored in the mobile communications device for a second one of the plurality of separate communication services.

In one embodiment of the invention, the means for merging comprises means for aggregating contact lists and/or address books that are stored on the device for circuit-switched telephony services and for IP-based communication services, such that entries for the same contact person can be associated with each other and then displayed to the user as a single entry or as a set of associated entries.

In one embodiment, the means for merging comprises:

means for comparing data entries within corresponding data fields of a plurality of contact lists and/or address books, which contact lists and/or address books are each associated with one of a plurality of separate client programs installed on the device for managing one of a plurality of separate communication services, thereby to identify potential matching data entries; and means for displaying the identified potential matching data entries to a device user to enable confirmation or rejection of the identified potential match.

In this embodiment, the user is provided with a selection mechanism via their user interface. The user enters instructions via this user interface to confirm or reject identified potential matches.

The plurality of separate communication services or channels that use an Internet Protocol network, and which are accessible via the communication manager of the present invention, preferably comprise an instant messaging channel and a VoIP channel. The plurality of services may also (or alternatively) comprise a video conferencing service, a file transfer service, an alerts service, and/or various other internet-based communication services. As well as different communication service types, there may be a plurality of parallel instant messaging channels and parallel VoIP channels from rival service providers such as Skype, Yahoo! and Windows Live Messenger. Users may access location based services and exploit a range of rich communication features.

The communications manager is preferably integrated with the means for sending and receiving signals via a circuit-switched network such as a PSTN, such that internet-based communication services and wireless telephony services are not only integrated within a single mobile communications device but are also accessible via a common communications manager. The communications manager may be, for example, a communication manager program integrating access to circuit-switched telephony services with access to internet-based communications such as a Skype™ service or Windows™ Live Messenger service.

In one aspect of the invention, access both to telephony services using a circuit-switched network (such as the PSTN) and to communication services using the IP network is provided by an enhanced user interface that provides a consistent user access mechanism for the different communication services. This is differentiated from known devices in which each separate communication channel relies on a separate client program running on the device, with little or no integration between circuit-switched telephony and packet-based communications, and in which separate actions by the device user are needed to activate each of the various services. Such known devices can only provide a fragmented user experience that can be frustrating for users who wish to manage multiple types of communication simultaneously. Furthermore, such known devices provide no facility for integrating information that is stored in association with different client programs on the mobile communications device.

Another aspect of the invention provides a mobile communications device including an integral communications manager for managing access to multiple separate communication channels, wherein the communications manager is automatically activated whenever the device is powered up. In one embodiment of the invention, a mobile telephone includes one or more client programs for establishing communications, which programs are automatically activated as part of the telephone's boot-up process when the telephone is switched on. One embodiment of the invention provides a connection manager client program that enables communication with a gateway server (such as a server running a Skype program) that can then provide access to an IP network. The connection manager client program can run as a background listener process which receives signals from the gateway server whenever there is an incoming call to the mobile communications device via one of the communication services associated with the connection manager. The same client program (or an associated client program) can also initiate outgoing voice calls and instant messaging chats via respective gateway servers, for example routing voice calls via a circuit-switched voice call that is sent via a wireless telephone network to an IP gateway and routing IM data via a data transmission to a separate gateway that handles instant messaging. The IP gateway server that receives the voice call then digitises and packetizes the voice data and transmits it via the IP network to the intended contact. Text-based chat communications have no need for the circuit-switched call and so will connect via an IP-based packet-data connection to the gateway server. Skype calls may have associated packet-based communications providing presence data.

This provision of a small footprint listener for incoming calls and a common communication manager for initiating a variety of types of outgoing communications avoids a telephone user having to explicitly start up multiple applications when the user switches on his or her mobile telephone or when the user wishes to initiate a communication. The communication manager or a small footprint connection manager can be available at all times that the device is turned on, so that the communication manager is ready to receive calls and messages.

Each service provider (such as Skype) may include its own small footprint listener to awaken the full client for incoming events such as calls and messages. However, a preferred embodiment of the invention provides a common small footprint listener for all incoming Internet calls and chats, as well as a common communication manager for initiating a variety of types of outgoing communications.

This automated activation of internet-based connectivity saves user effort, but can also be implemented to enable all users of mobile communications devices that implement this aspect of the invention to easily determine which other users within their address books and contact lists are currently connected to the network. By exploiting features for determining whether particular devices are currently connected to a communication network, and by exploiting new features for consolidating contacts lists and displaying presence indicators, device users can be given a much clearer indication of the communication channels that can be used for communicating with people listed in their contact lists and address books.

This makes it much easier for users to make an appropriate choice of which communication service to use to communicate with a particular one of their contacts, taking account of whether the contact is currently on-line as well as enabling consideration of the cost associated with different communication options. If an informed choice was only possible by checking multiple separate client programs, as is typically the case with known devices, the user is much more likely to simply try one of the available communication services than to make a genuine informed choice of the best service to use. This problem is made more acute because many mobile communication devices do not have sufficient processing power, battery power or RAM to support concurrent execution of the full set of applications that are available on the device. Therefore, users are discouraged from concurrently running clients for all of their communication services, and may be reluctant to launch multiple clients just to determine what communication services are currently available for a particular contact. Furthermore, it has generally not been possible to automate coordinated checking of a plurality of client programs to determine the communication options that are available for a particular contact. The inventors of the present invention have determined that there has been inadequate integration between the respective client programs and their various address books and contacts lists, and have developed a solution to those problems.

A further aspect of the present invention provides a method for merging a plurality of contact lists and/or address books that are stored on a mobile communications device, wherein a first one of said lists or books identifies contacts for traditional mobile communications (e.g. via a circuit-switched telecommunications network) using common fields in handset address books, such as telephone numbers and e-mail addresses. A second one of said lists or books identifies contacts for a packet-based communication service, such that entries within the first and second lists or books for the same contact can be associated with each other and then displayed to the user as a single entry or as a set of associated entries within a merged contact list or address book.

In one embodiment, the method for merging comprises: comparing data entries within corresponding data fields of a plurality of contact lists and/or address books, which contact lists and/or address books are each associated with one of a plurality of separate client programs installed on the device for managing separate communication services, thereby to identify potential matching data entries; and displaying the identified potential matching data entries to a device user to enable confirmation or rejection of the identified potential match.

In a mobile communications device according to one aspect of the invention, a communication controller for managing a plurality of separate IP-based communication channels is accessed via a dedicated access button to enable fast and intuitive access to IP-based communication services. The internet connectivity status of individual contacts within a contacts list is displayed on the device's user interface via a presence indicator and IP-based communications can be initiated from the contacts list, as simply and via a consistent user interaction to the interaction required to make a conventional voice call. This level of integration has not been provided in previous mobile telephones or similar wireless communication devices.

A further problem relates to correctly identifying the incoming caller identity from VoIP calls which are routed via the aforementioned circuit-switched to packet network gateway. In pure packet-data VoIP communications, it has been possible to signal in the packet-data headers the identity of a calling party. However, from the perspective of the mobile handset, the incoming call now appears as an incoming circuit-switched call—apparently originating from the gateway's telephone number or number range. A further aspect of the present invention provides a solution to this problem including a means to correctly display the caller name for incoming VoIP calls (such as Skype calls) that have been routed via the gateway.

BRIEF DESCRIPTION OF DRAWINGS

Embodiments of the invention are described below in more detail, by way of example only, with reference to the accompanying drawings in which.

DESCRIPTION OF EMBODIMENTS

Figure 1:
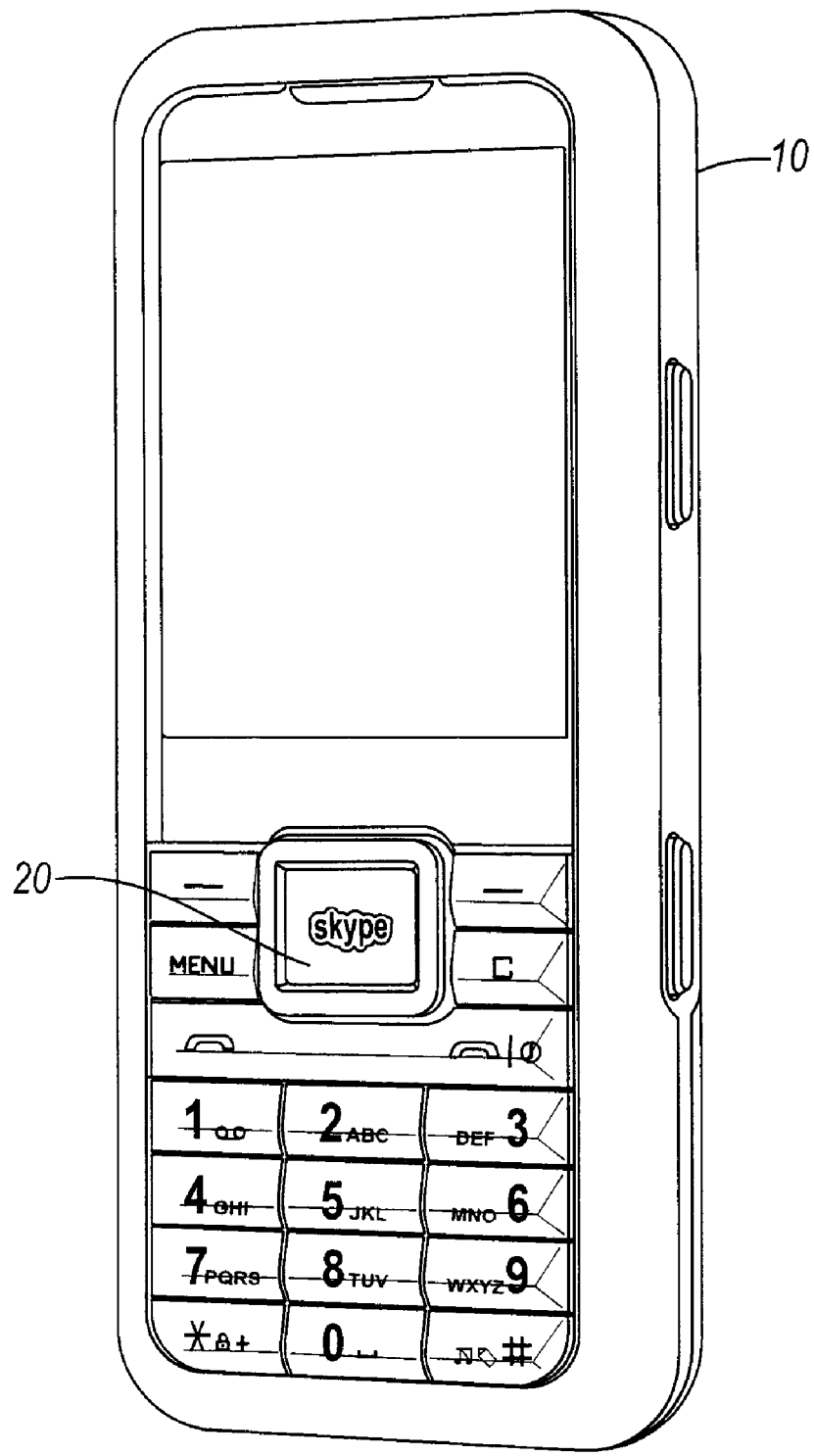
FIG. 1 shows a mobile telephone according to one embodiment of the invention, featuring a dedicated internet services selection button.
Figure 10:
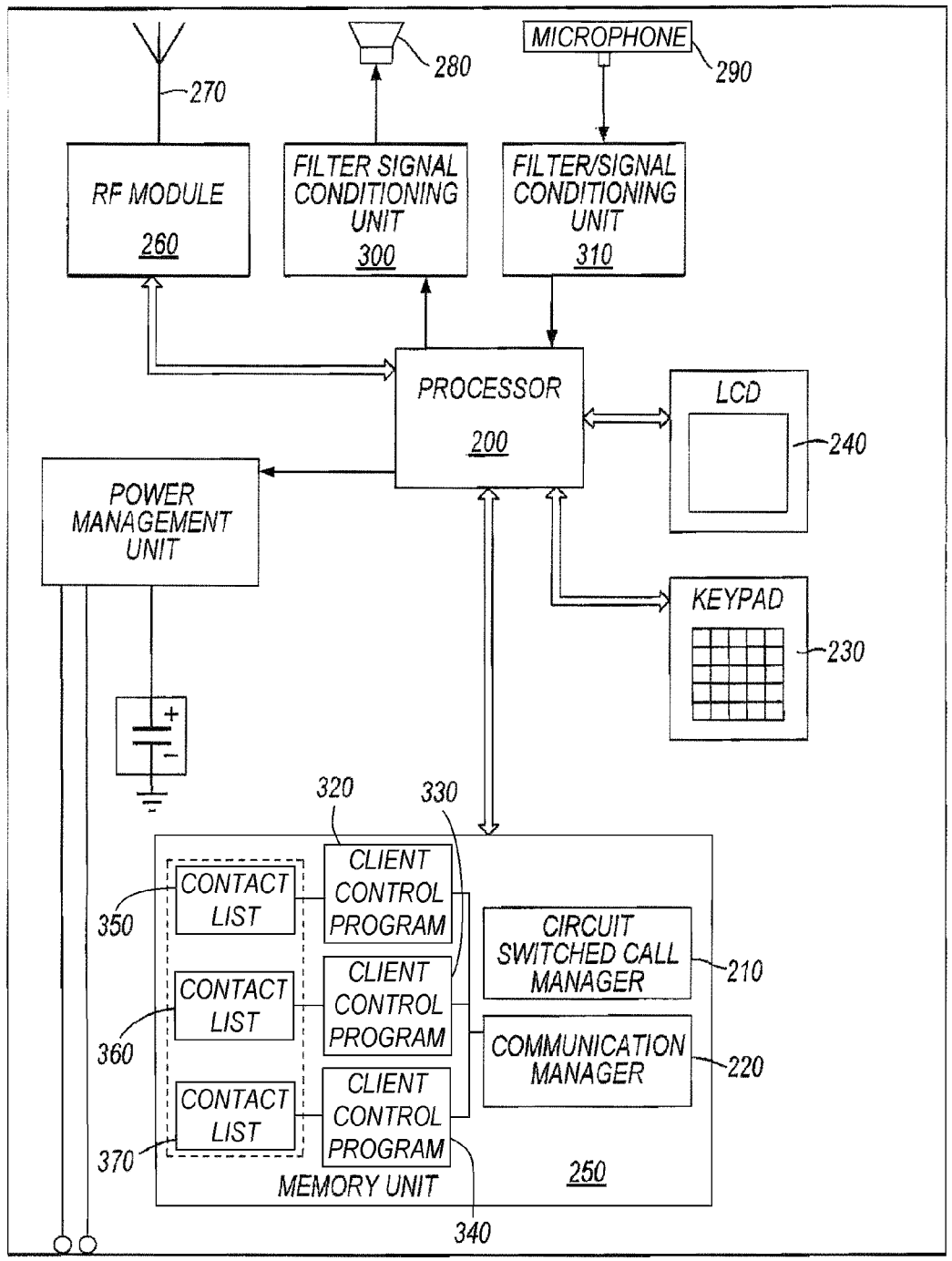
FIG. 10 is a schematic representation of a mobile communications handset showing a number of components involved in implementing the invention.

A mobile telephone that is suitable for implementation of the present invention is shown in FIG. 1 and in FIG. 10. Since mobile telephones are so widely used and their features are so widely understood, it is not necessary to describe all of their features herein. Nevertheless, relevant features of a telephone handset, including standard hardware components and software for implementing the present invention are described with reference to FIG. 10. The mobile telephone 10 of FIG. 1 differs from conventional telephones in that it incorporates a dedicated button 20 for accessing internet-based communication services and incorporates features providing an enhanced user interface, improved management of a plurality of communication services, and improved integration of data that is associated with the plurality of services. The internet services button 20 shown in FIG. 1 can be used to initiate a call via an integral Skype program within the mobile phone 10. The invention can also be implemented in other mobile communication devices, to provide a level of integration between circuit-switched and packet-switched communication services that has not previously been available.

The action which is invoked by user selection of the internet services button 20 will vary according to which service was 'in focus' (i.e. had been selected but not yet requested) when the button is pressed by the user. For example, the internet services button 20 may be pressed after the communication device user has selected a particular contact within their contacts list and selected a communication service or channel. As a first example, let us assume the user has selected a voice call service. In a first embodiment of the invention, user selection of the button 20 after the user selects a voice call service invokes a function of the communication manager to make an initial circuit-switched voice call to a PSTN-IP gateway server. The gateway server extracts the received voice data, transcodes the data if required, and creates a sequence of data packets which are then transmitted to the selected contact by the gateway server via an IP network. A separate client program may be running on the mobile device (either pre-loaded or downloaded after purchase of the device) to invoke each different communication service, and yet a single communication manager program can be used to provide a consistent user access mechanism for activating the various services. Other service selections may invoke functions for packet-based communications directly from the user's mobile device.

Figure 2A:
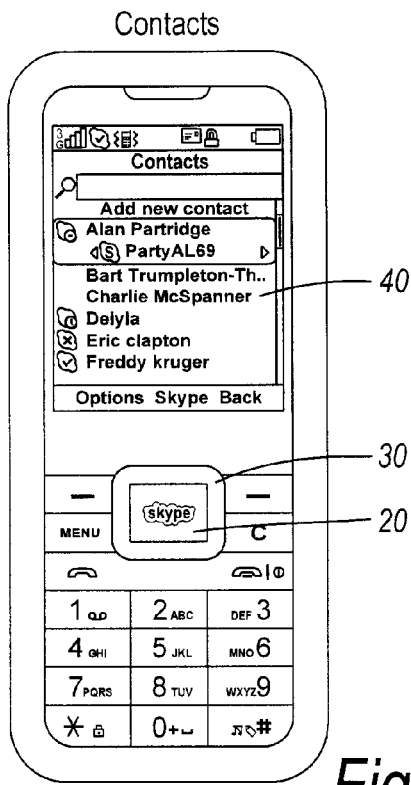
FIGS. 2A, 2B and 2C show example screen shots representing a user interface for a device in which internet services can be accessed and internet connectivity status can be displayed to the device user, according to an embodiment of the invention.
Figure 2B:
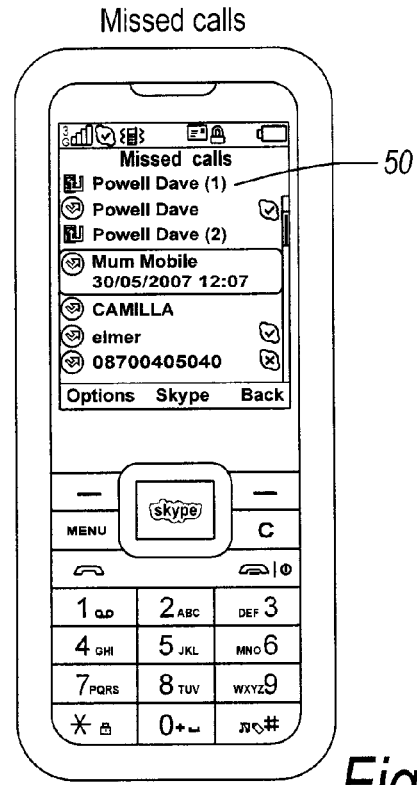
Figure 2C:
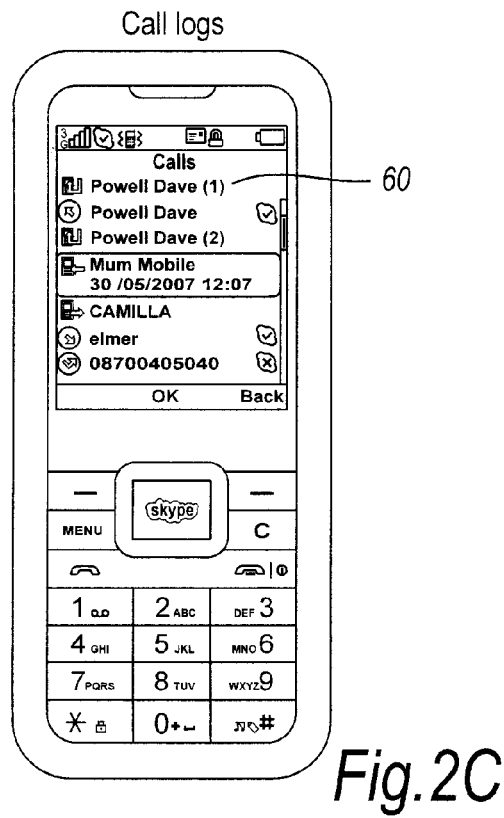
Figure 2D:
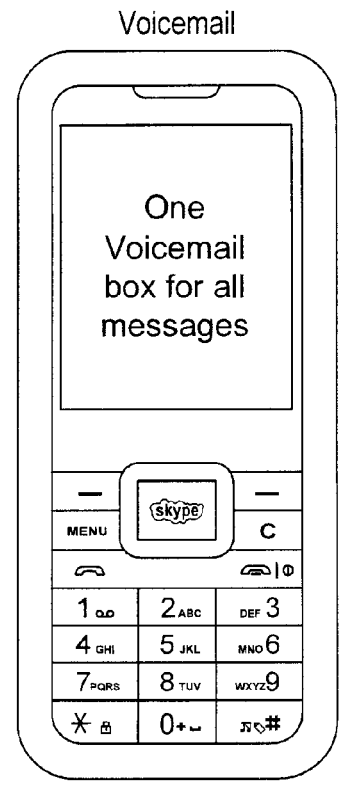
FIG. 2D is a schematic representation of a mobile communication device indicating that a common voicemail mailbox is provided for all message types.

FIG. 2A shows Skype connectivity listed within a set of accessible communication services for a person within a single consolidated contacts list 40 within the mobile telephone. Different communications services can be initiated by clicking the right or left side surface of the switcher button 30 that is located on the telephone's control panel surrounding the internet services button 20. The top and bottom surfaces of the switcher button can be pressed to move up and down within the contacts list. Although referred to as a button, the top, bottom, left and right edges of the switcher button 30 are each provided with a separate underlying pressure-sensitive button for detecting when the user presses any one of those surfaces to navigate in a corresponding respective direction. Such navigation controls are known in the art, but a dedicated button 20 for accessing internet services including Skype functions is new to the present telephone. FIGS. 2B and 2C show consolidated lists of missed calls 50 and calls received 60 from the mobile device, respectively, indicating that Skype calls are consolidated within a single overall list of missed calls and a single list of calls received for the telephone. As indicated by FIG. 2D, a single voicemail mailbox is provided on the mobile telephone for all voice calls whether made via a PSTN or IP network.

Figure 3A:
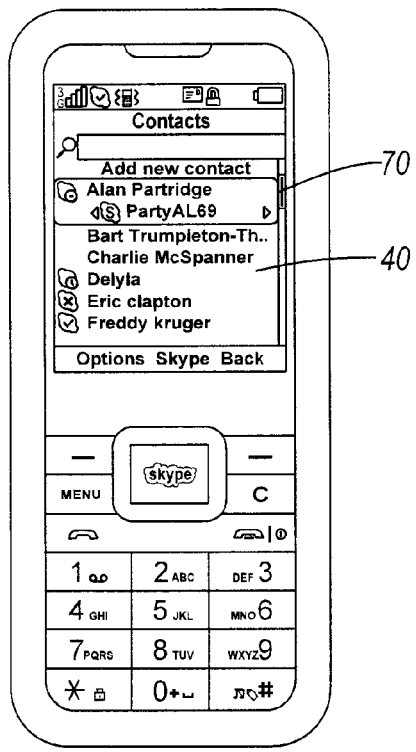
FIGS. 3A, 3B and 3C show example screen shots representing a user interface for a device in which Skype chat features can be accessed and used, according to an embodiment of the present invention.
Figure 3B:
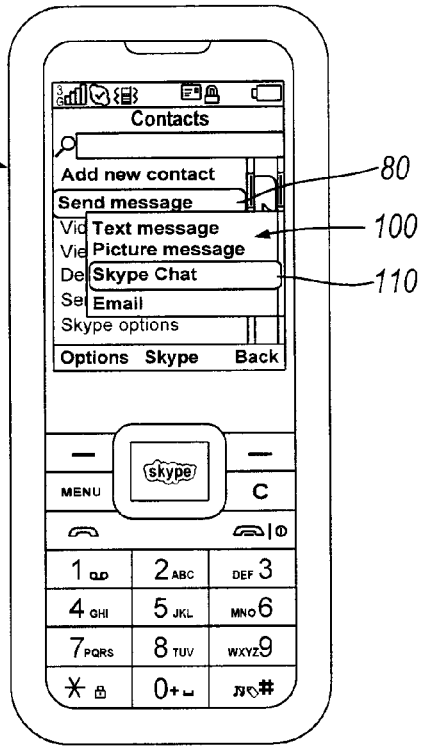
Figure 3C:
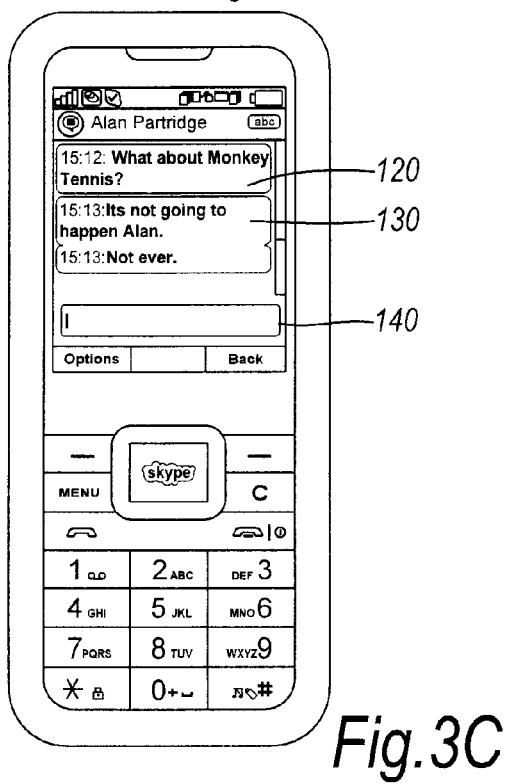

FIGS. 3A to 3C show a sequence of screen shots that are representative of the user interface as presented to a user when using the Skype chat capabilities of the present device. As shown in FIG. 3A, a contact person's details 70 can be selected from the consolidated contacts list 40 using conventional navigation instructions input via the switcher button 30. A menu 90 of options is then displayed to the user, who may select a 'Send message' option 80 from the menu. An additional pup-up menu 100 is then displayed from which the user may select the 'Skype chat' option 110. The user is then presented with an interface screen as represented in FIG. 3C, in which separate fields 120 and 130 are displayed to indicate the timestamped contributions made by the different participants in the chat. An additional user field 140 is presented for the user to enter his or her next contribution.

Figure 4A:
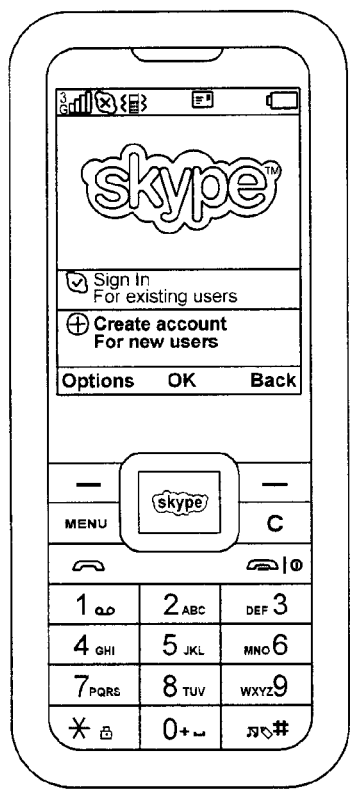
FIGS. 4A, 4B and 4C show example screen shots representing a user interface for a device in which Skype services can be accessed by an existing Skype user, according to an embodiment of the invention.
Figure 4B:
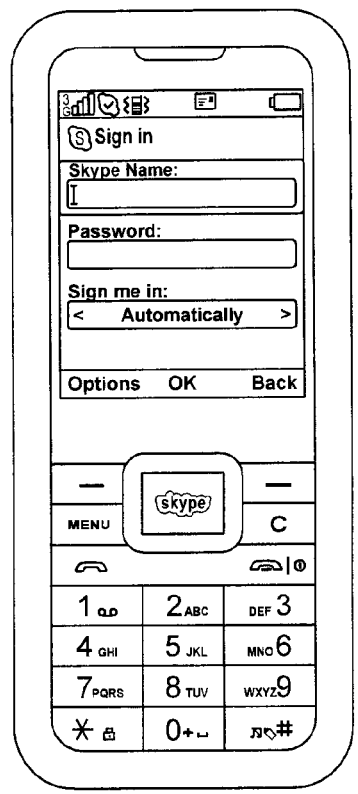
Figure 4C:
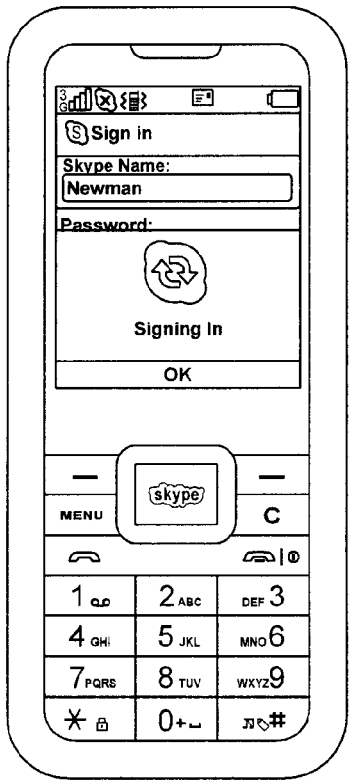
Figure 5A:
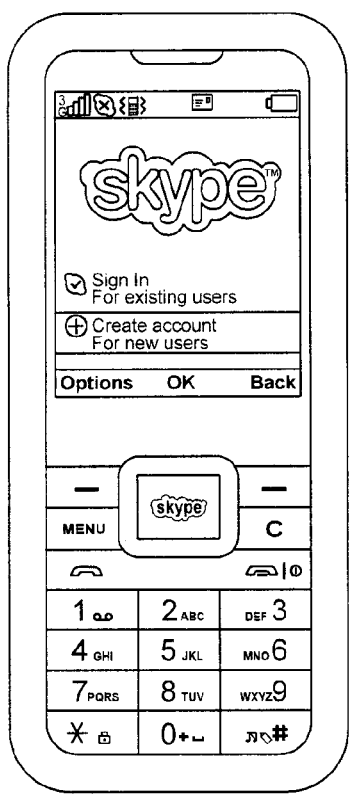
FIGS. 5A, 5B and 5C show example screen shots representing a user interface for a device in which Skype services can be set up for a new user, according to an embodiment of the invention.
Figure 5B:
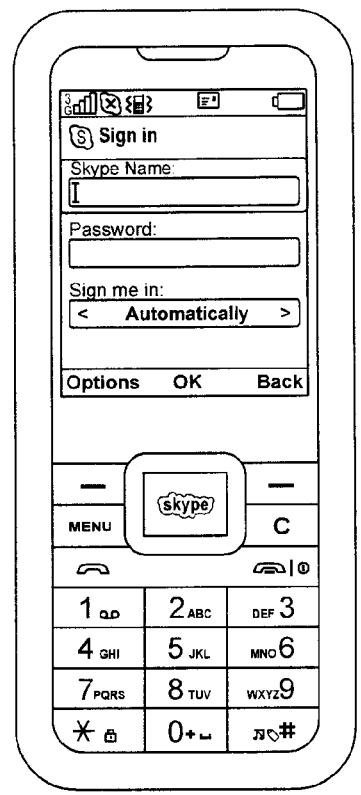
Figure 5C:
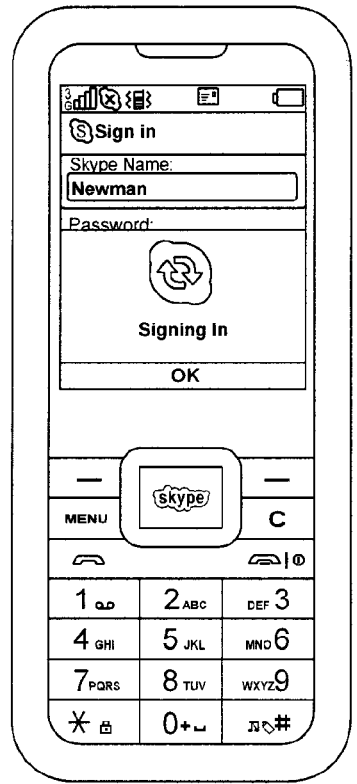

FIGS. 4A to 4C indicate the ease with which Skype features can be accessed, by showing a sequence of screen shots that are presented to an existing Skype user when first setting up a mobile telephone according to the present embodiment to use Skype features. Similarly, FIGS. 5A to 5C show a sequence of screen shots for user interface screens that are presented to a new Skype user when setting up the phone to use Skype services.

Figure 6A:
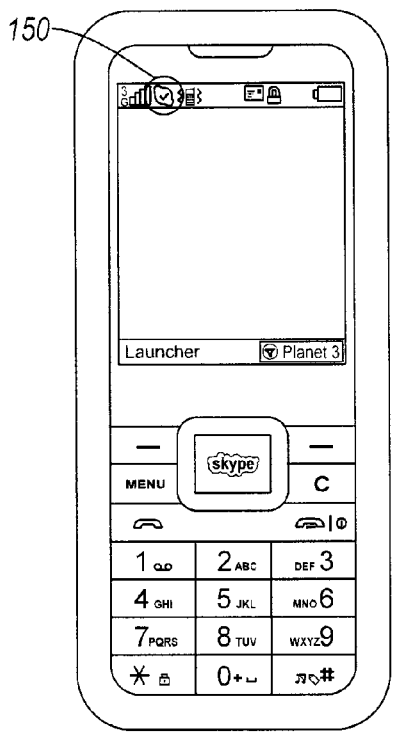
FIGS. 6A and 6B show example screen shots representing a user interface for a device in which the current device's Skype connectivity status and other user's connectivity status can be displayed, according to an embodiment of the invention.
Figure 6B:
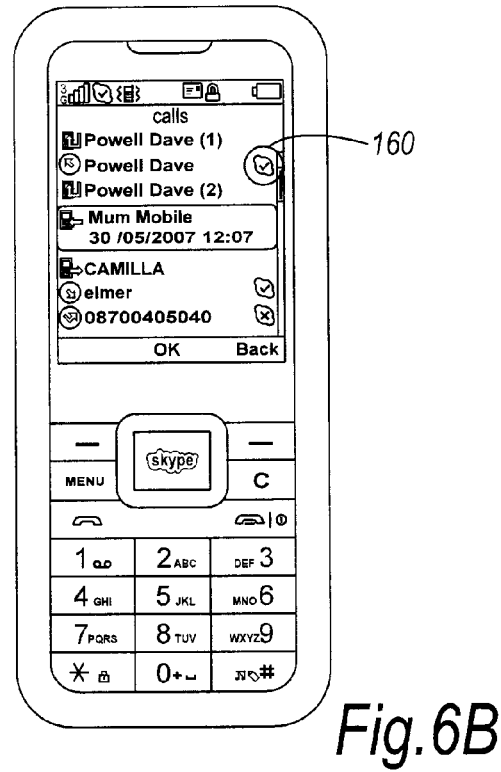

FIG. 6A shows an icon 150 representing the current connectivity status of the device according to the present embodiment for accessing Skype services. The same status will be presented to other Skype users who include the current device user in their contacts list. FIG. 6BH shows an example Skype connectivity status indicator 160 for a contact from whom Skype and other calls have been received. This indicator of the presence of a contact on the Skype network enables an informed decision to be made regarding when to communicate with the contact person and which communication channel to use.

Figure 7A:
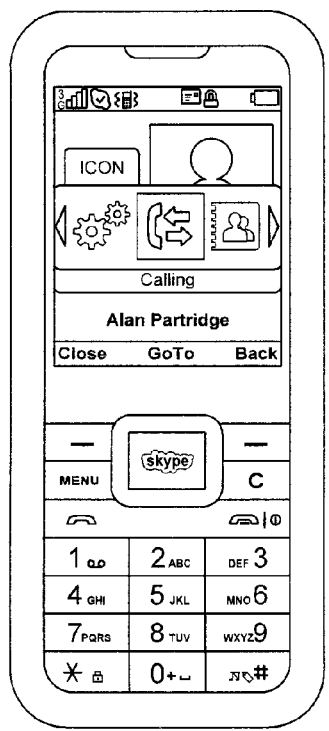
FIGS. 7A and 7B show example screen shots representing a user interface for a device enabling intuitive switching between services, according to an embodiment of the invention.
Figure 7B:
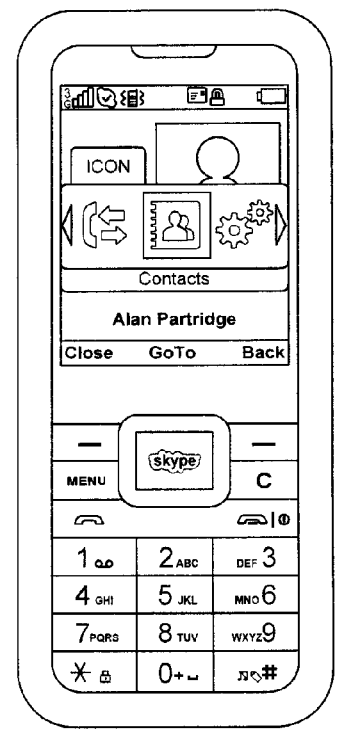

FIGS. 7A and 7B are example screen shots indicating the effect of using the switcher button 30 to navigate left and right within a set of options within the user interface of the device according to the present embodiment. One-click access to the most important areas of the user interface and to switch between tasks is made possible, such that laborious and complex navigation sequences are easily avoidable.

Figure 8A:
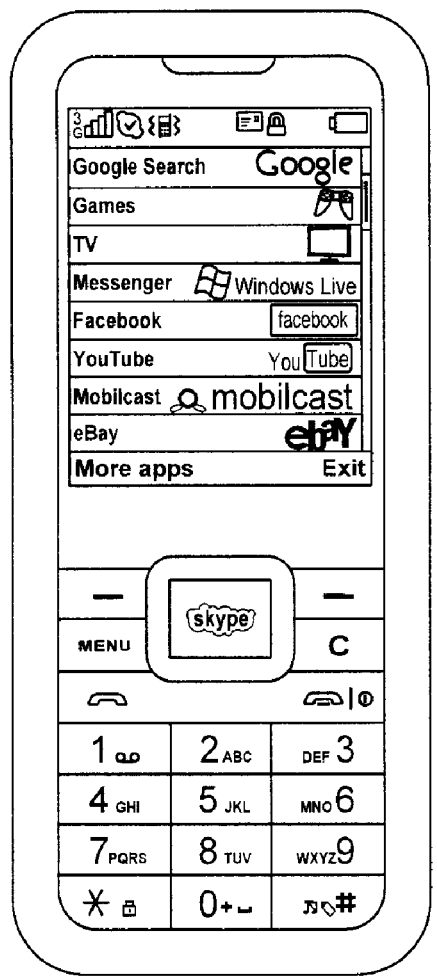
FIGS. 8A and 8B show example screen shots representing a user interface for a device providing access to internet services from a launcher menu.
Figure 8B:
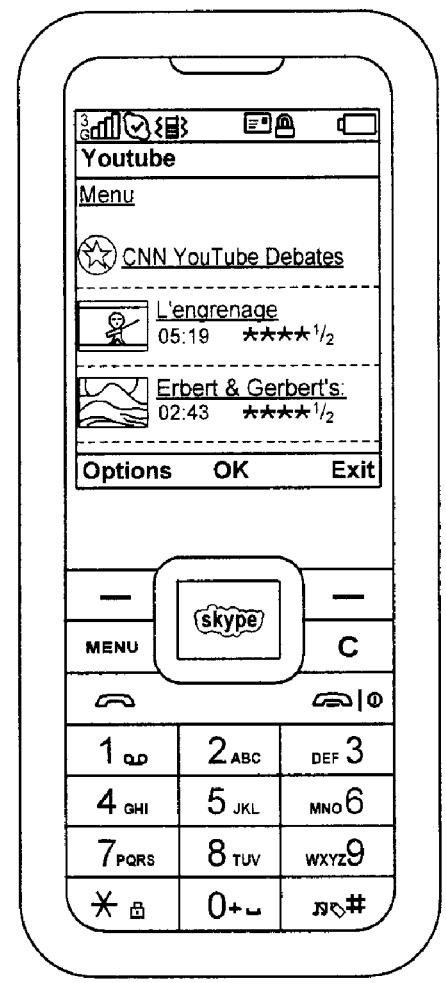

FIGS. 8A and 8B show example screen shots for an internet service launcher screen within the user interface of the present device, from which a number of Internet-based services can be accessed. The mobile telephone of the present embodiment includes a built-in Web browser that is activated in response to selection of a desired internet service, such as the popular YouTube, Google, Facebook and Yahoo! services as well as other applications and services.

As described above, a mobile communication device according to an embodiment of the present invention provides integration between various client programs that are each associated with a different communication channel, such that their separate contact lists and address books can be merged together.

Although a contact book is provided on the user interface of a communication device as part of a particular application, contacts are stored within the mobile device as a database managed by the operating system of the device, and this database is open to interrogation by native applications and other operating system functions via the operating system's API. Some functions may also be accessible by Java™ applications using JSR 75. The central contacts database comprises a collection of industry standard fields as well as, typically, a number of proprietary fields that are specific to particular device manufacturers or device or operating system providers.

For example, the standard fields include name, numbers, address details, such as within a known vCard. See RFC 2426 for a description of the standard number fields, address details etc within a vCard (for example at www.ietf.org/rfc/rfc2426/txt). See also RFC 4770 for a description of vCard Extensions for Instant Messaging (for example at www.ietf.org/rfc/rfc4770txt) which covers IM solutions such as Windows Live Messenger, Yahoo!, AOL, etc, but not Skype ID or other VoIP solution user identities. A particular device manufacturer's or provider's operating system may add such fields as spouse name, anniversary, etc. However, these are still predefined fields that a particular manufacturer or provider decided to add and there has in the past been no facility for users to add additional fields or to access proprietary fields from different client programs. Therefore, there has been a reliance on the operating system's native functions to access standard fields, and reliance on particular applications to access fields that were added for their use.

In a preferred embodiment of the invention, the device manufacturer or operating system provider adds the required new fields to the operating system's contact database to enable contacts' identity in instant messaging and VoIP service providers (e.g. SkypeID). In this preferred solution, the Skype client can export its contacts SkypeID to the native contact book via an operating system API or Java JSR75. However even in this case, it is likely that export function of Skype clients cannot determine if there is an existing contact entry for the SkypeID. Therefore, a simple export is likely to result in duplicate contact entries. A further benefit of integrating the contacts' identities into the operating system's contact database is that this enables the information to be synchronized with network servers for the purpose of backing up and restoring address books between handsets and with PC applications. Many 3G handsets support this data synchronization using Open Mobile Alliance's data synchronization OMA DS protocols (formerly known as SyncML However, at least some of these constraints have been mitigated according to an embodiment of the present invention, by means of the communication manager program which provides integrated access to a plurality of communication services or channels. In particular, the communication manager program according to this embodiment comprises a small footprint and low power-usage listener process which is activated whenever the device is switched on, as part of the boot up process, and then runs as a background process for receiving incoming Skype communications including voice calls and messages. This small footprint program is referred to as the connection manager hereafter, because it may have a more limited role than a full-functionality communication manager according to other embodiments of the invention. Respective client programs for each separate communication channel are activated by the listener process in response to an incoming call or message, or in response to the current device user requesting use of a communication channel. For incoming calls, the Skype ID of a caller is signalled to the mobile communication device by adding the Skype ID (and a preceding character) to a User-to-User Signalling (UUS) field. The UUS signalling data is then sent within the circuit-switched call set-up step, between the IP gateway and the mobile device.

As is known in the art, every Skype user is uniquely identified by a Skype name which is selected by the user when creating a Skype account. However, if a mobile Skype client receives a Skype call via a gateway that handles conversion from packet-switched to circuit-switched communications, the caller ID which is presented to the recipient will be that of the gateway. That is, the calling Skype name would not be presented by the gateway to the recipient mobile client and so cannot be used to trigger an update to presence data for the Skype caller, and cannot be used to show the Skype caller name to facilitate returning of missed calls.

To address this problem, the inventors of the present invention have designed a solution that exploits a User to User Signalling service (UUS service) implicit activation mechanism, to enable the passing of a caller's Skype name to the called mobile Skype client at call setup time. The calling Skype name is encoded in the IA5 string format within a User-to-User Information Element (UUIE) parameter that is provided in the call setup request message. This solution is shown schematically in FIG. 9.

If the UUIE cannot be passed to a roaming mobile client by a transit network, there is no impact on the call setup procedure as such. The mobile-terminating Skype call can still be completed, but unfortunately in that case without presenting the calling Skype name to the mobile client.

Figure 9:
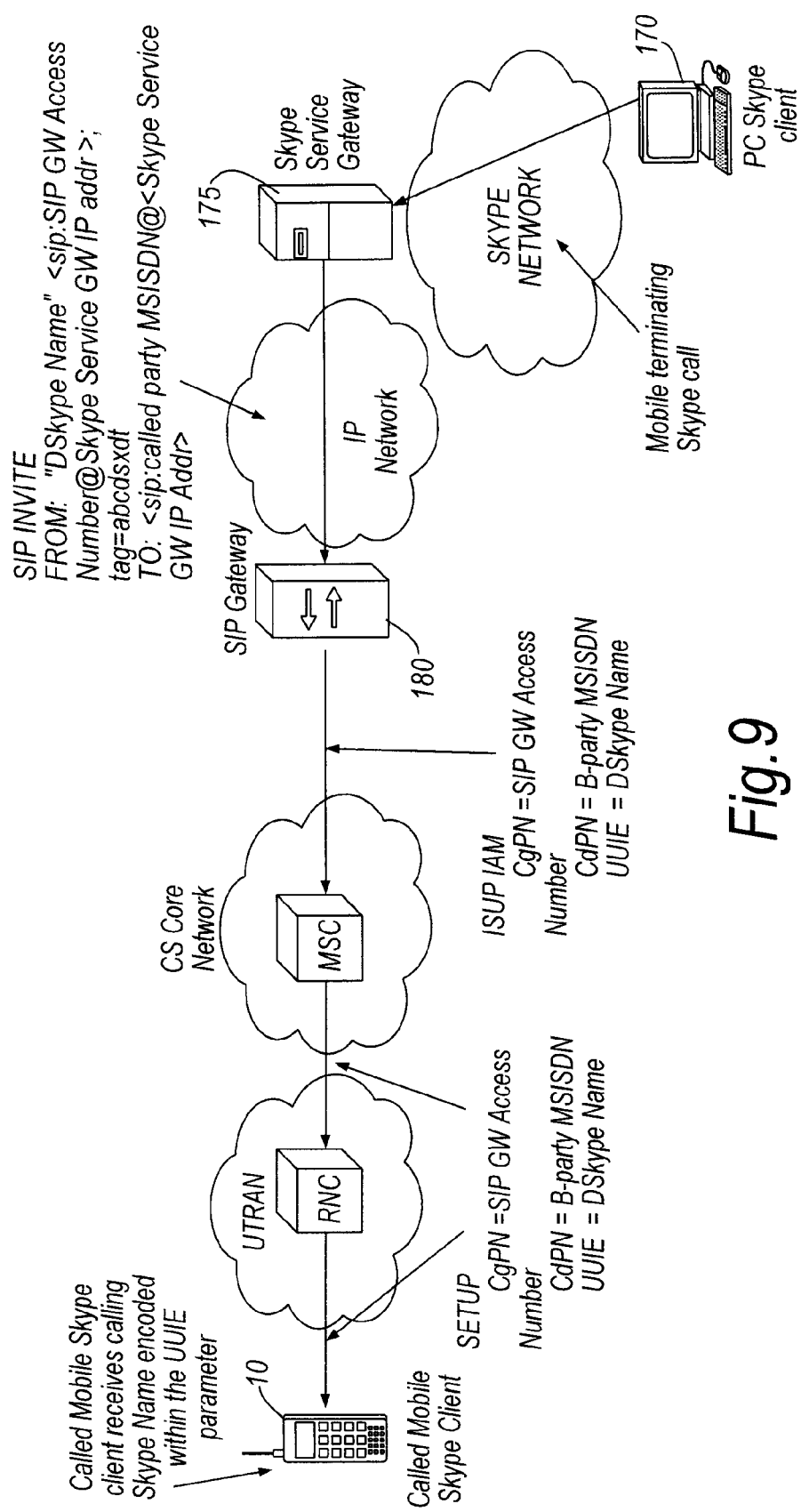
FIG. 9 is a schematic representation of the progress of a mobile-terminating Skype call across a network for an embodiment of the invention that sends a calling Skype name.

In the solution shown in FIG. 9, a Skype client 170 running on a PC (that can be anywhere in the world) initiates a mobile-terminating Skype call via the Skype network to a Skype service gateway server 175. The Skype service gateway 175 is a server providing connectivity to an IP network. This Skype service gateway 175 sends a SIP INVITE call via the IP network to a SIP gateway server 180. When sending the outbound SIP INVITE message, the Skype service gateway 175 prefixes the received Skype name with a marker (which may be as simple as a 'D' prefix in the FROM header), to enable identification of mobile-terminating Skype calls. The SIP gateway 180 converts the SIP invitation between SIP and ISUP formats (the Calling Party Number (CgPN) is the SIP GW Access Number, and the Called Party Number (CdPN) is the B-party MSISDN), adds a UUIE, and passes the ISUP IAM message on to the called mobile Skype client 185 (encoded in IA5 string format in the UUIE parameter of the ISUP IAM message) that is running on a mobile communication device 10, by means of the mobile switching center (MSC) in the CS Core Network, and Radio Network Controllers (RNC) in the UMTS Terrestrial Radio Access Network (UTRAN). The mobile device's communication manager program uses the UUIE parameter information to display the calling Skype name, and interprets the D prefix as indicating a mobile-terminating Skype call. That is, the header field entry D informs the communication manager that the ISUP IAM message includes a Skype name, and this then takes precedence over the gateway's caller ID. The format of the SIP invitation from the Skype service gateway 175 to SIP gateway 180, the reformatted ISUP IAM message passed on by the SIP gateway, and a further reformatted SETUP call are shown in FIG. 9 by way of example. Two embodiments are possible here. Either all calls can be checked for a Skype ID or only calls identified as being from specific caller ID's (e.g. from known gateways) may be checked for user-specific identifiers.

FIG. 10 is a schematic representation of the functional components of a mobile telephone handset implementing the present invention. A processor 200 executes instructions of a circuit-switched call manager 210 and of a communication manager 220 that is provided for initiating and responding to IP-based communications. The processor also processes user inputs entered via a keypad 230 and processes data for display via LCD 240. The call manager 210 and IP communications manager 220 are installed in a memory device 250 of the device together with other software for controlling the handset. Wireless communications between the handset and a base station (not shown) make use of a RF interface module 260 and an antenna 270. A speaker 280 and microphone 290 and respective filter/signal conditioning units 300, 310 are provided for audio output and input. As shown by dashed lines in FIG. 10, the circuit-switched call manager 210 and communication manager 220 may be integrated as a single computer program. The communication manager 220 is associated with a plurality of separate client control programs 320, 330, 340 which are each associated with a different IP-based communication service. Each client program has associated data such as contact lists 350, 360, 370 also held in the device memory 250.

Figure 11:
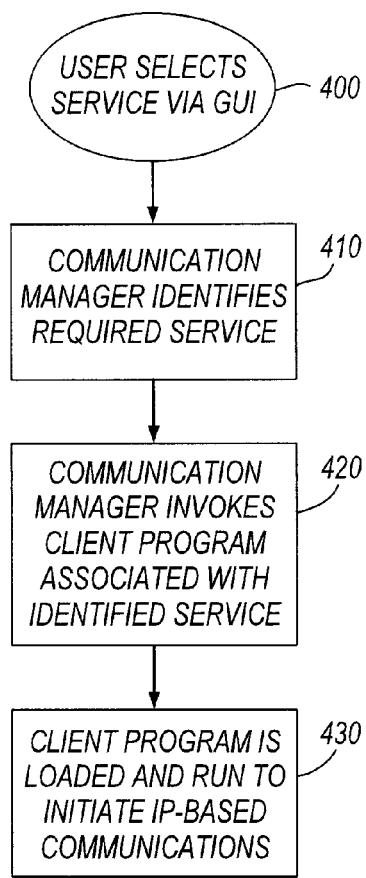
FIG. 11 shows operations performed according to an embodiment of the invention.

As shown in FIG. 11, one embodiment of the invention includes a method for activating client programs only when their respective communication service is required. A plurality of client programs 320, 330, 340 are held in an inactive state on the device until triggered by the communication manager 220. The method includes identifying 410, from user interaction 400 via a user interface of the device, a desired packet-based communication service. In response to identification of the desired communication service, a respective one of a plurality of client control programs that is installed on the device is invoked 420. The client program is loaded 430 into active system memory and is executed 430 to initiate communications via its corresponding communication service.

Figure 12:
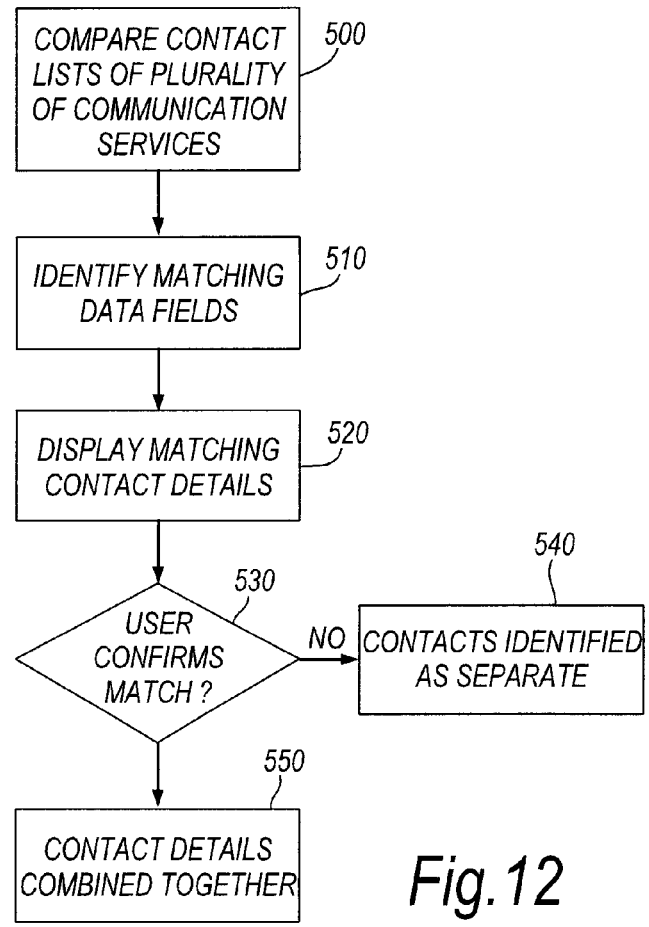
FIG. 12 shows a sequence of operations performed according to a further embodiment of the invention.

As noted above, the device according to the present embodiment supports merging of contacts lists and address books that are stored on the device associated with different communication services and applications. This is represented in FIG. 12. For example, a SIM card may include a local contacts list and the device memory may hold a contacts list as well as call history information and a list of sent and received messages. It is already known within mobile telephones to consolidate those lists, although different operating systems take a different approach to this merging between a SIM and handset memory. In the past, an instant messaging client may include a local contacts list whereas other Skype services may each have their own different lists and these have not been merged together or merged with the contact list and address books held in the phone's memory and on the SIM card. The inventors of the present invention have recognised the need for increased integration and provided a solution to that problem.

The solution according to a first embodiment involves identifying matching data fields within the different address books and contacts lists of the respective client programs that manage the different communication services. The data entries within these matching fields are compared 500 using a matching algorithm. In the present embodiment, this is implemented by comparing data strings to determine when the first few (e.g. 3) letters of a data entry within a contacts list match the first few letters of a data entry in the matching field within a separate address book. These apparent matches are then identified 510 as potential matches, but are not yet merged together—since merging is only performed when a valid match has been confirmed by the user 530. In alternative embodiments, other matching algorithms may be used and comparisons can be made to identify apparently matching data entries without limitation to identified matching data fields (for example, a matching name or other data string may appear in two different data fields that do not share the same field name and yet the matching algorithm is able to identify a potential match.

When potential matches have been identified 510, these identified potential matches are displayed 520 to the device user to enable a decision to be made as to whether the separate data entries do indeed relate to the same contact. A partial name match may correspond to different spellings of the same contact name (for example a user-selected Skype name may differ from the name assigned to that person by a mobile device user who may enter a full name or a nickname) or they may represent two entirely different contacts and the inventors of the present invention have determined that the device user is generally best placed to determine which is the case. If the user rejects 530 an identified potential match, no merging occurs 540. If the user confirms an identified potential match as being correct, the contacts list of a particular internet service communication channel is merged 550 into the native operating system contacts database. This ensures that the native operating system contacts database is only ever supplemented and nothing is removed, ensuring that other handset functions continue to work (circuit-switched voice calling, call history, messaging, sending and receiving vCards, etc).

Having merged contact details such as Skype ID with an address book entry, it is now possible to display the address book entry instead of an individual's Skype ID if this is preferred.

The invention claimed is:

1. A mobile communications device comprising:
   means for sending and receiving signals via a circuit-switched telecommunications network; and
   means for initiating communications over an Internet Protocol network via each of a plurality of separate communication services;
   a data storage unit for storing data associated with each of the separate communication services;
   means for merging the data that is stored in the data storage unit for a first one of the plurality of separate communication services with data that is stored in the data storage unit for a second one of the plurality of separate communication services, said means for merging comprising
     means for comparing data entries within corresponding data fields or a plurality of contact lists, which contact lists are each associated with one of a plurality of separate client programs installed on the device for managing separate communication services, thereby to identify potential matching data entries; and
     means for displaying identified potential matching data entries to a device user and enabling user confirmation or rejection of the identified potential match;
   a storage means for storing the merged contact list entries as a single entry on the mobile communication device so that this single entry is accessed for communication; and
   a common graphical user interface (GUI) for displaying the data in the storage means and providing an integrated user access mechanism for the sending and/or receiving of communications over the Internet Protocol network via each of the plurality of separate communication services.

2. The device of claim 1 further comprising:
   a communication manager providing access to the plurality of separate communication services, the communication manager activating a respective client control program for each respective one of said plurality of separate communication services in response to identification of a required communication service, wherein the communication manager comprises an event listener program that is responsive to a request from the communication device for the required communication service, or responsive to an incoming signal via a communication service to trigger the respective client control program for the requested or incoming communication service to load and run on the device, so that communication can take place over the requested or incoming communication service.

3. The device of claim 2, wherein the plurality of separate communication services that use the Internet Protocol network, and which are accessible via the communication manager, comprise services selected from a group consisting of: instant messaging, VoIP communication, video conferencing, file transfer and communication of alerts.

4. The device of claim 3, wherein the communication manager comprises a call initiation program for initiating a Skype call, the program for initiating the Skype call being integrated with the means for sending and receiving signals via the circuit-switched telecommunications network, such that internet-based communications via a Skype service and circuit-switched telephony services are accessible via a common communications manager.

5. The device of claim 1, wherein the means for merging comprises means for aggregating contact lists that are stored on the device for telephony services and for other IP-based communication services, and means for associating entries with each other in response to identifying entries as relating to a single contact person, and means for reordering entries within the GUI such that entries relating to the same contact person are then displayed to a user as a single entry or as a set of associated entries.

6. The device of claim 1, wherein the plurality of separate communication services that use the Internet Protocol network comprise services selected from the group consisting of: instant messaging, VoIP communications, video conferencing, file transfer and communication of alerts.

7. The device of claim 1, wherein the common GUI provides user access mechanisms for telephony services using the circuit-switched telecommunications network and for communications over an Internet Protocol network via each of the plurality of separate communication services.

8. The device of claim 1, wherein the means for initiating communications over the Internet Protocol network comprises a client program for initiating a circuit-switched call to a PSTN-IP gateway server, the call requesting at least one specific internet-based communication service.

9. The device of claim 1 further comprising:
a power-on switch; and
a communication manager for managing access to the plurality of separate communication services, wherein the communication manager includes an activation program for activating the communications manager as part of a device start-up process when the device is switched on, the communications manager being an event listener program that invokes communication services in response to signals received from a gateway server indicating internet connectivity status or other user presence information, for users identified in a contacts list stored on the device.

10. The device of claim 9, wherein the communications manager is responsive to an internet service caller ID within a data field within a signal that is used to notify a mobile telephone's communication manager of an incoming call, to compare a caller ID with data held in a data storage unit to determine a match between a caller and a user identified in the contacts list.

11. The device of claim 9, further comprising means for displaying Skype user presence indicators.

12. The device of claim 9, wherein the communications manager is the event listener program that invokes communication services in response to incoming or outgoing communication requests to or from the device.

13. The device of claim 12, wherein the communication manager activates a client control program for a respective one of said plurality of separate communication services, in response to identification of a required communication service.

14. The device of claim 12, wherein the communication manager is responsive to a request for an outgoing voice call to initiate a circuit-switched voice call via a wireless telephone network to an Internet Protocol gateway server that digitizes and packets the voice data and transmit the voice data via the IP network to an intended contact.

15. A method for merging contact list data that is stored in a data storage unit of a mobile communication device for a first one of a plurality of communication services with contact list data that is stored in the data storage unit of the device for a second one of the plurality of communication services, said mobile communication device having means for sending and receiving signals via a circuit-switched telecommunications network; and means for initiating communications over an Internet Protocol network via each of the plurality of separate communication services; the method comprising:
comparing data entries within corresponding data fields of a plurality of contact lists by a means for comparing in the device, which contact lists are each associated with one of a plurality of separate client programs installed on the device for managing separate communication services, thereby to identify potential matching data entries;
displaying the identified potential matching data entries to a device user via a user interface;
enabling user confirmation or rejection of the identified potential match;
merging the potential matching data entries if the device user confirms the match;
storing the merged contact list entries as a single entry on the device so that this single entry is accessed for communication; and
displaying the stored merged contact list entries on a common graphical user interface (GUI) for providing an integrated user access mechanism for the sending and/or receiving of communications over the Internet Protocol network via each of the plurality of separate communication services.

16. The method of claim 15 further comprising:
identifying a desired packet-based communication service;
in response to identification of the desired communication service, invoking by an event listener a respective one of a plurality of client control programs installed on said device to initiate communications via the desired communication service, wherein said plurality of client control programs are held in an inactive state in a memory of the device prior to said identification of a required service, and a respective one of the client control programs is loaded and run on the device by the event listener in response to the identification so that communication takes place via this communication service.

* * * * *